United States Patent [19]
Drijftholt et al.

[11] Patent Number: 4,957,758
[45] Date of Patent: Sep. 18, 1990

[54] METHOD FOR REFINING OILS OR FATS

[76] Inventors: Jacob Drijftholt, Patrijzenhof 61, 1742 Be Schagen; Johannes C. M. van den Berg, Kempenaar 03-03, 8242 Bd Lelystad, both of Netherlands

[21] Appl. No.: 222,863

[22] Filed: Jul. 22, 1988

[30] Foreign Application Priority Data

Jul. 24, 1987 [NL] Netherlands ............... 8701760

[51] Int. Cl.$^5$ ................................. A23L 1/01
[52] U.S. Cl. .................... 426/330.6; 210/259; 210/DIG. 8; 426/422
[58] Field of Search ............ 426/330.6, 422, 423, 426/424, 438; 210/416.5, DIG. 8, 167, 180, 780, 784, 806

[56] References Cited

U.S. PATENT DOCUMENTS

| 3,415,181 | 12/1910 | Hart | 99/408 |
| 3,759,388 | 9/1973 | Thomason | 210/DIG. 8 |
| 3,984,447 | 10/1976 | Cooper | 210/167 |
| 4,591,434 | 5/1986 | Prudhomme | 210/167 |
| 4,622,135 | 11/1986 | Williams | 210/416.5 |
| 4,735,815 | 4/1988 | Taylor | 426/423 |
| 4,747,944 | 5/1988 | George | 210/416.5 |
| 4,768,426 | 9/1988 | Nett | 426/438 |
| 4,826,590 | 5/1989 | Turman | 210/DIG. 8 |

FOREIGN PATENT DOCUMENTS

| 1954932 | 10/1967 | Fed. Rep. of Germany ... 210/416.5 |
| 587675 | 3/1975 | Switzerland ............... 210/416.5 |
| 2160437 | 12/1985 | United Kingdom . |

Primary Examiner—Carolyn Paden
Attorney, Agent, or Firm—Buchanan Ingersoll

[57] ABSTRACT

A method is disclosed for refining oil which in heated condition is used in the production of consumable products such as French fried potatoes. The oil is fed through a filter system immediately after starting the frying process and within the time within which free fatty acids or fatty acid oxidation products could be formed.

8 Claims, 3 Drawing Sheets

METHOD FOR REFINING OILS OR FATS

BACKGROUND OF THE INVENTION

The invention relates to a method for refining oils or fats which are used in a container in the heated condition for cooking an edible product therein, which refining is carried out by passing the oil or the fat through a filter. In cooking edible products in hot oil or fat, such as frying or deep-frying potato chips (French fries), croquettes, pancake rolls, etc., the problem arises that the oil becomes contaminated in a relatively short time. This contamination is dependent on the nature of the product processed in the oil and, depending on the product, consists of contamination with a varying size range and clogging-up capacity. The burning of said contamination results in the generation of smoke and the deposit on the products, while the microscopically small particles produce the typical frying smell. In the case of installations which are in operation for prolonged periods this means a very unpleasant working atmosphere for the staff, while the product to be delivered rapidly becomes bad. Furthermore, as a result of heating the oil is subject to oxidation which is promoted by the oxygen introduced along with the product to be deep-fried.

The oxidation and the microscopic product contamination are the cause of the formation of fatty acid oxidation products. Furthermore, hydrolysis occurs due to the introduction of water with the product to be deep-fried, as a result of which free fatty acids are formed.

A limit is imposed in relation to the fatty acid content by the Keuringsdienst van Waren (Food Inspection Department).

Cleaning the oil with a filter is known. However, this is either not done at the right time, viz. after the oil has been used, or continuously but to an inadequate extent and in a manner which results in the oil deteriorating, for example, as a result of the introduction of oxygen. Little is thereby achieved. Although coarse particles can be separated off in said manner, the very fine particles and the fatty acids or fatty acid oxidation products, or the water, remain present in the oil.

SUMMARY OF THE INVENTION

The object of the invention is therefore to provide an effective solution for this problem and to appreciably prolong the service life of the oil or the fat content of the container of such an oil, and to remove substances, such as fatty acid oxidation products or free fatty acids, which are injurious to health.

According to the invention this object is achieved in that the oil or fat content of the container is always completely passed through a filter system and back into the container within a certain time after the start of the cooking process, which time is determined by the time in which the injurious substances proceed to form free fatty acids or fatty acid oxidation products.

The invention is based on the surprising insight that no free fatty acids or fatty acid oxidation products are formed by oxidation and microcontamination, in particular, as a result of removing from the oil in good time injurious substances which are introduced and formed during frying, as a result of which the latter are unable to effect the quality and the stability of the oil or the fat adversely.

DESCRIPTION OF THE PREFERRED EMBODIMENT

Figure 1:
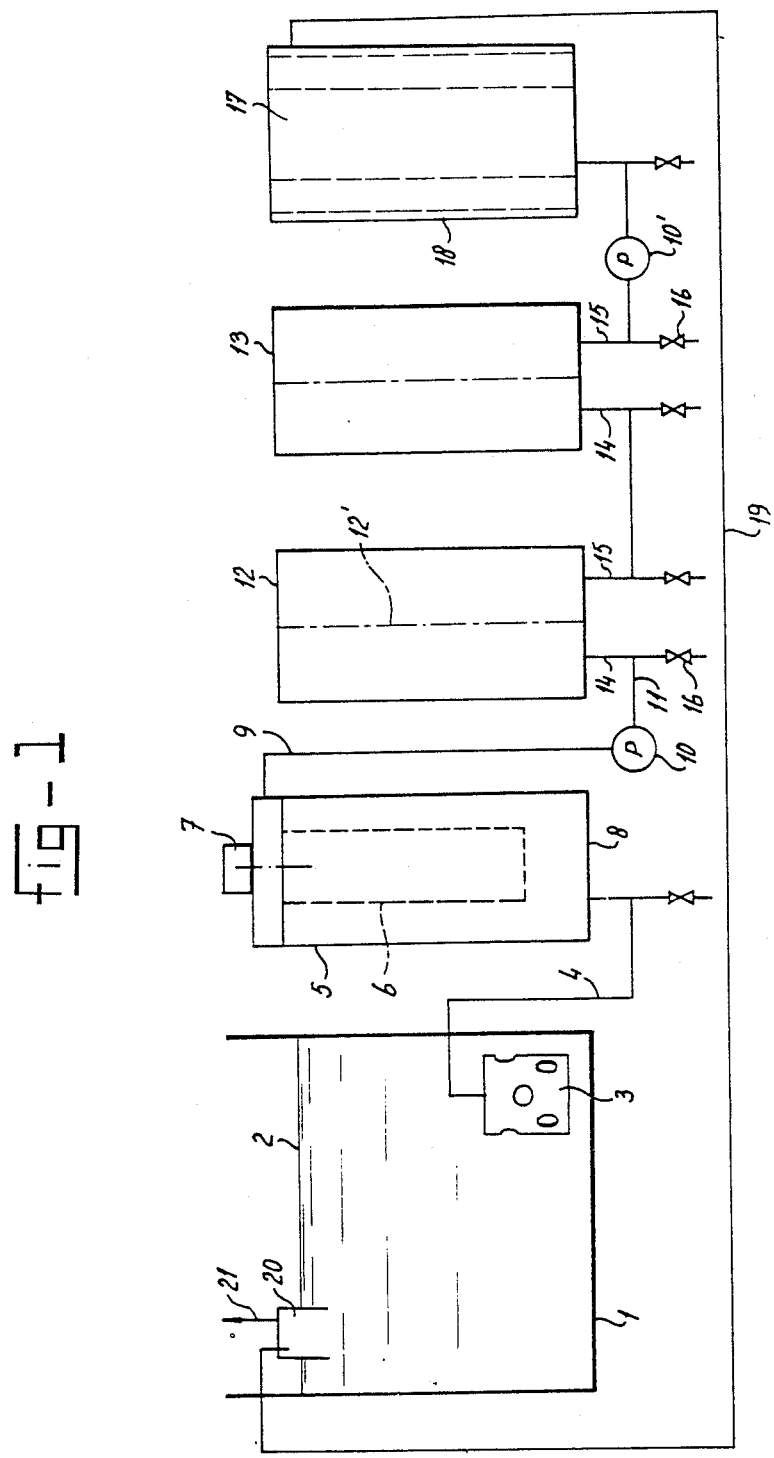

According to the invention, for this purpose, the oil or the fat is passed through a series of filter stages with decreasing pore size and consequently increasing flow capacity, which is understood to mean that a quantity of oil flowing through a filter stage per unit time can flow therethrough without any forcing of the flow being carried out. In the case of edible oils or fats, care has to be exercised since saponification occurs if pressures are too high and vortice currents are too strong. Increasing fineness of the filter therefore requires a larger surface. The first stage preferably has a pore size which is less than 30 $\mu$m (micrometer), preferably even less than 25 $\mu$m, while the final stage still has to separate off 0.1 $\mu$m particles.

In order to avoid imposing too much load on the oil, it is also desirable, according to the invention, that the oil or the fat is sucked and not pressed through the first filter stage and, in particular, sucked with a vacuum not exceeding 0.5 bar. The suction is of importance since a pressure drop exceeding 1 bar cannot then occur. With a pressure pump, the pressure will be able to increase excessively if the filter clogs up. As a result of the suction, separation of water, air and oil also takes place. In the said first filter stage, which is preferably constructed in the form of a rotating filter, the separation is then carried out of the nonmutually adhering coarse granular particles which are collected in a type of filter known per se to the person skilled in the art in a tank situated at the bottom of the housing of the filter and can be removed therefrom. Removal of the granular particles means that particles which could in fact adhere to each other are able to pass through the filter and do not give rise as a result of settlement to clogging up of the filter surface or reduction thereof.

In the final stage, the pressure is higher but does not exceed 5 bar. There the very small particles are consequently separated off and here a separate pressure pump which forces the oil through the very fine filter (microfilter) is preferably used. In said microfilter, the water may remain behind. The oil passes therethrough along with the air and the air can be separated from the oil during the return to the oven.

Between the first and final stage, one or more filters are used which have a pore size not exceeding 5 $\mu$m with a pressure not exceeding 3 bar, which filters are connected to the pressure side of the pump which sucks the oil to be purified out of the oven and through the rotating filter.

The apparatus for carrying out the method according to the invention comprises a heatable container which, according to the invention, is connected to a filter system in which the first stage comprises a rotating filter which, via a suction line, is in communication with the liquid content of the container and with a suction pressure pump downstream of said filter, a second stage which comprises one or more surface filters arranged in series upstream of said suction pressure pump and a final stage which comprises a microfilter with a suction pressure pump in the line between the second stage and the final stage.

In this connection, it may be of benefit that at least the microfilter of the final stage can be heated and this heating can be brought about electrically by heating the container of said microfilter or can be obtained by constructing said container with a double wall and passing the hot oil which originates from the second stage into said double wall before it enters the filter. The electrical heating or heating by means of a part of the hot oil may be switched on and off with the aid of a thermostatic switch placed in said microfilter. Said heating serves to obtain the required viscosity which is necessary to force the oil through the microfilter.

The purified oil which emerges from the final stage is fed back to the container in which the deep-frying is carried out. According to the invention, this preferably takes place via a bell jar which projects into the liquid along with the mouth of the return line above the level of the liquid and has an air removal pipe. Air which could be present in the oil can then be liberated and escape.

The entire system may virtually be considered as a closed system because oxygen can no longer enter during the filtration.

The various particles which are separated off in the filters are no longer able to burn because they do not return to the oven.

The contamination introduced into the oil with the products to be treated therefore no longer come into contact with the products as a combustion organism.

As a result of this purification, the oil has a better heat transfer capacity, as a result of which overheating of the oil no longer takes place when the latter flows past the heating elements.

The invention will now be explained in more detail with reference to the drawings.

Figure 2:
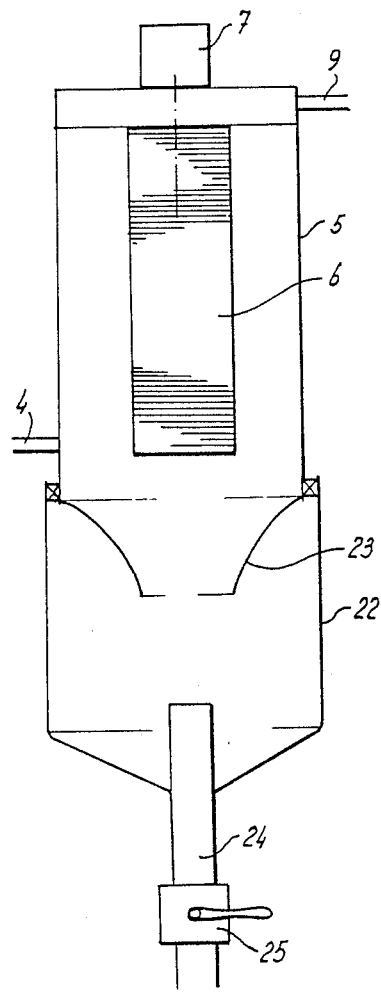
Figure 3:
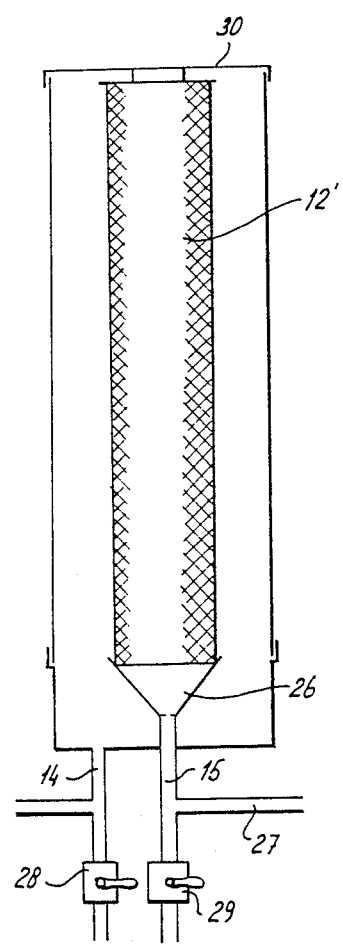
Figure 4:
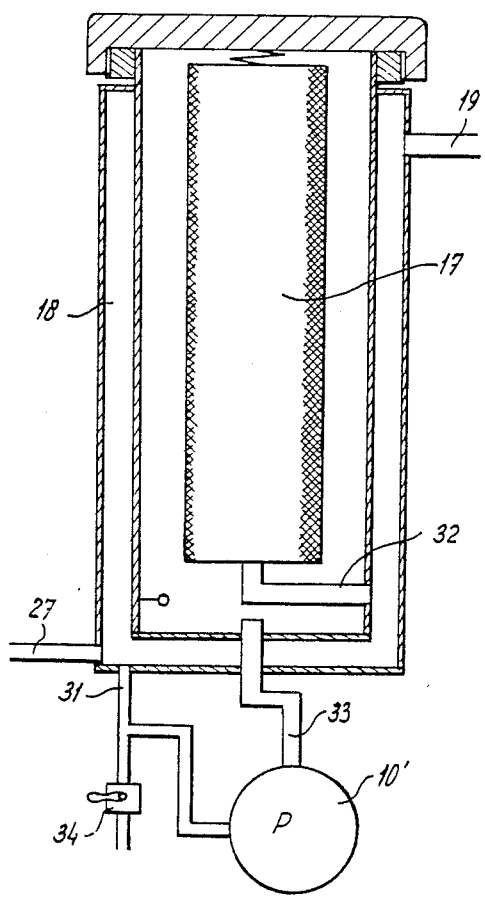

FIG. 1 shows diagrammatically the general design of the apparatus for applying the method according to the invention, FIG. 2 shows diagrammatically the first filter stage, FIG. 3 shows diagrammatically a filter of the second stage, and FIG. 4 shows diagrammatically the microfilter.

In FIG. 1, 1 indicates a container filled with deep-frying fat, the level of which is indicated at 2.

Situated at 3 is a suction bell jar which is connected to the housing 5 of a rotating filter via a line 4. The filter unit is indicated by 6 and may comprise segments rotating with respect to each other and stationary segments, of which the rotating segments are driven by a motor 7. Dirt particles are collected on the outside wall of the filter unit 6 and drop down into the base section 8.

Oil passing through the filter is sucked via the interior of the filter and the line 9 in communication therewith by a pump 10, in particular with a vacuum of 0.5 bar, which pump 10 forces oil via the line 11 into a series of surface filters 12 and 13 in which the filter body is diagrammatically shown by the line 12'. Two surfaces filters 12 and 13 are shown, but the number of filters to be used is in this case dependent on the required flow capacity, allowance being made for the pore size of the filter units. The filter cartridges in said filters 12 and 13 have to be replaceable. The line connections such as 14 and 15 connected at the base have shutoff valves 16 for removing oil and dirt remaining behind in the housings 12 and 13 when cleaning of the installation and replacement of the filter cartridges is necessary.

The oil emerging from the last filter unit of the second stage is forced with the aid of the pump 10' into the microfilter 17, which may have a heatable wall 18 and is so constructed that it retains particles measuring less than one micron.

Purified oil emerging from said last stage returns via the line 19 to the vessel 1 and debouches into a bell jar 20 at a point situated above the liquid level 2. Said bell jar has an air removal pipe 21.

The rotating filter 5, 6 indicated diagrammatically in FIG. 2 with drive motor 7 has a removable collection tank 22 in the bottom section and a funnel-shaped guide 23 above it. In said tank dirt particles may be collected which drop off the filter unit 6 and can be removed with the tank. The tank also has a drainage line 24 with stop cock 25.

FIG. 3 shows diagrammatically a filter unit of the second stage. The filter 12' may comprise a filter sleeve of non-woven acrylic fibres wound round a support which provides a hollow core so that oil passing through the filter sleeve can enter the drainage line 27 via the funnel 26. The lines 14 and 15 again have shutoff valves 28 and 29 which are necessary for cleaning the system. Said filter units have a cover 30 to which the filter cartridge 12' is attached and by means of which replacement is possible.

FIG. 4 shows diagrammatically the microfilter of the last stage. The inlet line 27 from the last filter unit 13 (FIG. 1) is fed to the double wall 18.

The oil entering the double wall is able to leave the latter via the outlet or return line 19. If the pump 10' starts to operated, then it sucks approximately three quarters of the oil supplied and forces the latter through the line 33 into the housing of the microfilter and through the filter 17. The oil which has passed through the filter returns via the line 32 to the jacket 18 and proceeds to the discharge 19.

In the jacket there is a temperature sensor which switches on the pump 10' on reaching the correct temperature, for example 120° C.

The filter cartridge 17, which must be able to retain particles measuring 0.1 micrometer may in this case comprise a piece of fibre material, for example also acrylic fibres, wrapped round a support.

With the method and the apparatus according to the invention, an appreciably longer oil or fat service life is achieved, and in particular a multiple of the usual service life. A finer edible product is obtained which has a better taste and does not have the often bitter taste of products which have been treated with dirty oil. The product is therefore healthier. The smoking (generation of smoke) from the fat no longer occurs so that the working atmosphere is improved and the deep-frying smell no longer occurs.

Obviously, the entire installation, including the various filter stages, should be matched to the product to be treated and consequently to the degree of contamination which may occur, and obviously, in designing the various filter stages account should be taken of the liquid content which has to have been completely circulated at least within the time in which fatty acids can be formed. Obviously, the various filters should be regularly replaced.

It is important that it is possible for the first time, as a result of the method and apparatus according to the invention, to avoid deep-fried foodstuffs being unhealthy as a result of the previously excessive content of fatty acid oxidation products (mutagenic compounds), something against which the Keuringsdienst van Waren (Food Inspection Department) and other authorities which are concerned with public health have always warned.

This applies also to oxidation products which are are growth-inhibiting and are harmful to the functioning of the liver.

We claim:

1. Method for refining oils or fats which are used in a container in the heated condition for cooking an edible product therein, which refining is carried out by passing the oil or the fat through a filter comprising a series of filter stages with decreasing pore size and matching flow capacity wherein said oil or fat is sucked through the first filter stage with a vacuum not exceeding 0.5 bar, characterized in that the oil or fat content of the container is always completely passed through a filter system and back into the container within a certain time after the start of the cooking process, which time is determined by the time required to prevent the formation of free fatty acids or fatty acid oxidation products.

2. Method according to claim 1, characterized in that the oil or the fat is forced through the final stage with a pressure not exceeding 5 bar.

3. Method according to claim 2, characterized in that, between the first stage and the final stage, the oil or the fat is passed through one or more filters with a pore size not exceeding 5 $\mu$m in a pressure not exceeding 3 bar.

4. Method according to claim 3, characterized in that the oil is returned to the container via an air separator.

5. Method according to claim 2, characterized in that the oil is returned to the container via an air separator.

6. Method according to claim 1, characterized in that, between the first stage and the final stage, the oil or the fat is passed through one or more filters with a pore size exceeding 5 $\mu$m in a pressure not exceeding 3 bar.

7. Method according to claim 6, characterized in that the oil is returned to the container via an air separator.

8. Method according to claim 1, characterized in that the oil is returned to the container via an air separator.

* * * * *